United States Patent
Baumgarten et al.

(10) Patent No.: US 9,516,812 B2
(45) Date of Patent: Dec. 13, 2016

(54) COMBINE HARVESTER HAVING A DRIVER ASSISTANCE SYSTEM

(71) Applicant: CLAAS SELBSTFAHRENDE ERNTEMASCHINEN GMBH, Harsewinkel (DE)

(72) Inventors: Joachim Baumgarten, Beelen (DE); Andreas Wilken, Bissendorf (DE); Christoph Heitmann, Warendorf (DE); Joern Brinkmann, Harsewinkel (DE); Christopher Vieregge, Doerentrup (DE)

(73) Assignee: CLAAS Selbstfahrende Erntenmaschinen GmbH, Harsewinkel (DE)

( * ) Notice: Subject to any disclaimer, the term of this patent is extended or adjusted under 35 U.S.C. 154(b) by 0 days.

(21) Appl. No.: 14/862,545

(22) Filed: Sep. 23, 2015

(65) Prior Publication Data
US 2016/0088794 A1     Mar. 31, 2016

(30) Foreign Application Priority Data
Sep. 26, 2014   (DE) .................. 10 2014 113 965

(51) Int. Cl.
| | | |
|---|---|---|
| *G06F 7/70* | (2006.01) | |
| *G06F 19/00* | (2011.01) | |
| *G06G 7/00* | (2006.01) | |
| *G06G 7/76* | (2006.01) | |
| *A01D 41/127* | (2006.01) | |
| *A01D 41/12* | (2006.01) | |
| *A01F 12/40* | (2006.01) | |

(52) U.S. Cl.
CPC ......... *A01D 41/127* (2013.01); *A01D 41/1243* (2013.01); *A01F 12/40* (2013.01)

(58) Field of Classification Search
CPC ... A01D 41/127; A01D 41/1243; A01D 12/40
USPC .......................................................... 701/50
See application file for complete search history.

(56) References Cited

U.S. PATENT DOCUMENTS

| | | | |
|---|---|---|---|
| 5,569,081 A | 10/1996 | Baumgarten et al. | |
| 6,863,604 B2 * | 3/2005 | Behnke ................ | A01D 41/127 460/6 |
| 7,086,942 B2 * | 8/2006 | Niermann .......... | A01D 41/1243 460/111 |
| 7,261,633 B2 * | 8/2007 | Benes ................ | A01D 41/1243 460/111 |
| 7,306,174 B2 * | 12/2007 | Pearson .................. | A01F 12/40 239/663 |
| 7,487,024 B2 * | 2/2009 | Farley ................ | A01D 41/1243 701/50 |

(Continued)

FOREIGN PATENT DOCUMENTS

| | | |
|---|---|---|
| DE | 10147733 | 4/2003 |
| EP | 0685151 | 12/1995 |

(Continued)

*Primary Examiner* — Arpád Fábián-Kovács
(74) *Attorney, Agent, or Firm* — Michael J. Striker

(57) ABSTRACT

A combine harvester includes a driver assistance system that regulates a spreading on the ground of a crop flow exiting the combine harvester. The driver assistance system includes spreading strategies that can be selected in order to regulate the spreading of the crop flow exiting the combine harvester.

18 Claims, 5 Drawing Sheets

(56) References Cited

U.S. PATENT DOCUMENTS

| | | | |
|---|---|---|---|
| 8,010,262 B2* | 8/2011 | Schroeder | A01D 41/1243 |
| | | | 701/50 |
| 9,066,470 B2* | 6/2015 | Ricketts | A01D 41/1243 |
| 9,220,195 B2* | 12/2015 | Eggenhaus | A01D 41/127 |
| 2014/0171161 A1* | 6/2014 | Bischoff | A01D 41/127 |
| | | | 460/1 |
| 2015/0046043 A1* | 2/2015 | Bollin | B60W 50/08 |
| | | | 701/50 |
| 2015/0120143 A1* | 4/2015 | Schlichting | B62D 13/06 |
| | | | 701/41 |
| 2016/0052525 A1* | 2/2016 | Tuncer | B60W 50/085 |
| | | | 701/50 |

FOREIGN PATENT DOCUMENTS

| | | | |
|---|---|---|---|
| EP | 1514466 | 3/2005 | |
| EP | 1790207 | 5/2007 | |
| WO | WO 2005102027 A1 * | 11/2005 | A01D 41/1243 |

\* cited by examiner

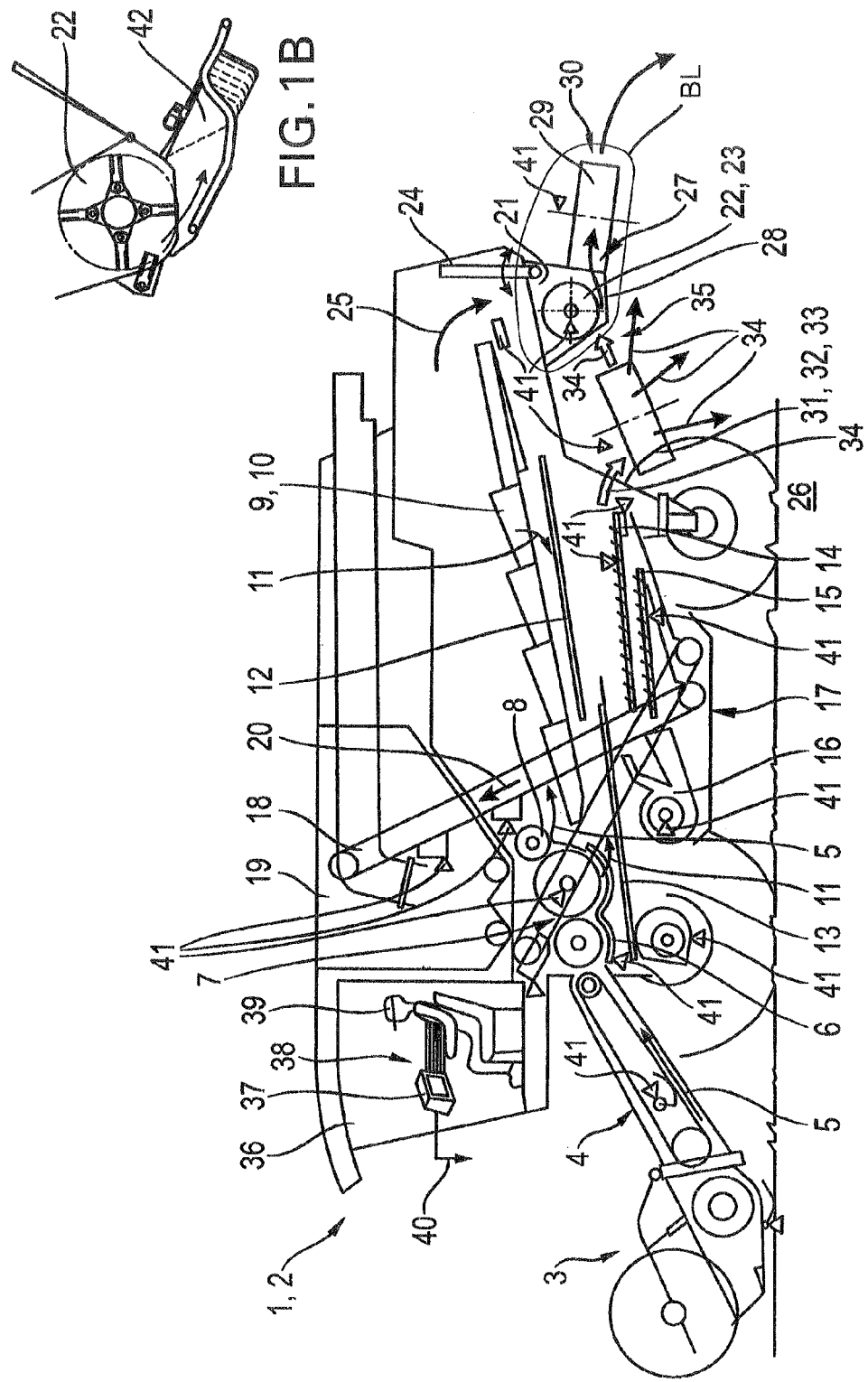

COMBINE HARVESTER HAVING A DRIVER ASSISTANCE SYSTEM

CROSS-REFERENCE TO A RELATED APPLICATION

The invention described and claimed hereinbelow is also described in German Patent Application DE 10 2014 113 965.8 filed on Sep. 26, 2014. This German Patent Application, subject matter of which is incorporated herein by reference, provides the basis for a claim of priority of invention under 35 U.S.C. 119(a)-(d).

BACKGROUND OF THE INVENTION

The invention relates to a combine harvester having a driver assistance system, which regulates the spreading on the ground of a crop flow exiting the combine harvester The non-grain proportion harvested by a combine harvester during the harvesting operation is often spread directly on the harvested territory, e.g., to improve the soil quality. In this connection, it is important that the spread crop has qualities that permit it to decay easily, thereby ensuring that the nutritive components thereof are available in the subsequent vegetation phase. Optimal decay is achieved when the crop spread on the ground is in suitably short pieces and is spread homogeneously across the working width of the combine harvester.

Diverse solutions, which are intended to satisfy these requirements, are known from the prior art. For example, EP 0 685 151 discloses a system in which the wind conditions in the region of the crop spreading device of the combine harvester are determined and the discharge behavior of the spreading device is regulated according to the wind conditions. Such a system has the advantage that a spreading of the broken straw-chaff mixture conveyed out of the combine harvester that is non-uniform due to cross winds is avoided or at least reduced.

EP 1 790 207 discloses a system in which the spreading of the crop flow exiting the combine harvester in the rear region thereof is regulated depending on the position of the crop edge. Such a system ensures that the portion of remaining material to be spread on the ground is not discharged into a crop yet to be harvested, since this would have the disadvantage that already-threshed crop would be picked up again by a combine harvester.

Reference also is made to EP 1 514 466, which discloses a combine harvester having a chopper and spreading unit and an infrared camera in the rear region thereof. The infrared camera senses the quality of the distribution of the broken straw-chaff mixture deposited on the ground on the basis of the detected temperature distribution, wherein higher temperatures are an indicator of a greater material feed height. On the basis of the determined temperature change, kinematic parameters of the crop chopping (or shredding) and spreading device are adapted such that a substantially uniform temperature distribution sets in across the spreading width, which ultimately serves as an indicator of homogeneous crop spreading.

All the described systems have the disadvantage that these typically only ever evaluate one defined parameter in order to determine the spreading quality. Such a system is incapable of detecting complex interrelationships between highly diverse parameters that influence the homogeneity of crop spreading.

The problem addressed by the invention is therefore that of avoiding the described disadvantages of the prior art and, in particular, of providing a driver assistance system, which better detects and accounts for the complex interrelationships between highly diverse parameters, which influence the spreading of the crop on the ground.

SUMMARY OF THE INVENTION

The present invention overcomes the shortcomings of known arts, such as those mentioned above.

Given that a combine harvester is equipped with a driver assistance system that regulates the spreading on the ground of a crop flow exiting the combine harvester according to spreading strategies stored so as to be selectable, the present invention ensures that the complex interrelationships between highly diverse parameters, which influence the spreading of the crop on the ground, are better detected and taken into account.

In an embodiment, high-quality and efficient crop spreading is achieved when the selectable spreading strategies comprise at least one or more of the spreading strategies "uniform crop spreading," "chop quality," and "energy efficiency." In this context, the spreading strategy "uniform crop spreading" brings about an optimization of the spreading of the crop flow on the ground. The "chop quality" spreading strategy results in an optimization of the chopping or shredding of the crop flow in the shredding device, while the "energy efficiency" spreading strategy ensures optimization of the energy demand for the chopping or shredding and spreading of the crop flow.

In an embodiment, the invention provides that a spreading strategy or a combination of a plurality of spreading strategies can be selected by the driver of the combine harvester or can be proposed by the driver assistance system. This substantial result thereof is that the potentials for optimization of the individual spreading strategies can be combined in a synergistic manner.

In an embodiment, an even higher-quality optimization of the crop chopping/shredding and spreading sets in when each of the spreading strategies accounts for a plurality of pieces of information that are accessible in the driver assistance system, wherein this information includes, at the least, the information "throughput parameters", "material or throwing properties", "machine parameters", and "ambient conditions".

In terms of throughput, a sufficiently good optimization of the chopping/shredding and spreading of the crop flow is ensured by the invention in that the information "throughput parameters" includes one or more of the throughput-relevant parameters grain throughput, material feed height in a slope conveyor assigned to the combine harvester, drive engine load, required drive power of the shredding device, required drive power of the spreading devices, and/or transverse and longitudinal distribution of the crop flow in the shredding device.

Given that, the information "material and throwing properties" accounts for one or more of the throwing property-relevant parameters straw moisture, chopping length, fanning out, crop density, toughness, and type of crop, the homogeneity of crop spreading is further improved as disclosed herein.

Moreover, the energy demand required to chop/shred a crop flow is adapted, in a highly flexible manner, to the suitability of decay of the crop flow to be chopped or shredded when the shredding device is designed as a straw chopper and the crop flow is chopped or shredded in the straw chopper via the interaction of revolving chopper knives with stationary counter blades, at least one shear bar and one or more grinding straps, and the information "machine parameters" includes one or more of the machine-relevant parameters number and position of the grinding straps, the counter blades, the shear bars, and wear parameters of the chopper knives and the speed parameters of the chopper shaft.

In an embodiment, the invention results when the spreading device that spreads the crop flow on the ground is designed as a radial spreader and has, at the least, deflectable spreading plates and one or more blowers, and the information "machine parameters" includes one or more of the machine-relevant parameters deflection, oscillatory frequency and spreading curve of the spreading plates, and speed parameters of the blowers and upstream revolving working mechanisms of the combine harvester. In this manner, it is possible to flexibly adapt the spreading of crop on the ground to changing crop properties or changing ambient conditions, such as tilt and wind conditions. In this context, it has proven advantageous for the information "ambient conditions" to include air humidity and air temperature parameters, wind parameters, and tilt parameters.

Given that the spreading device, which spreads the crop stream on the ground, is designed as a chaff blower or a chaff spreader and the machine-relevant parameters include, at the least, the speed of the blower assigned to the chaff blower or the chaff spreader, it is also ensured that the chaff exiting the cleaning device is either spread directly on the ground or can be transferred, in a targeted manner, to another spreading device, e.g., a radial spreader.

A further improvement of the spreading of the crop on the ground also is brought about in that the spreading device, which spreads the crop flow on the ground, is designed as a discharge hood equipped with crop guide tracks and the machine-relevant parameter includes, at the least, the orientation of the crop guide tracks.

In an embodiment, a particularly efficient optimization of the crop chopping/shredding and spreading is achieved when the inventive driver assistance system processes the particular spreading strategy with consideration for the available information and characteristic curves stored in the arithmetic logic unit and brings about an optimization of the quality criteria crop spreading, chop quality, and energy demand.

In an embodiment, an evaluation of the optimization efficiency is ensured when the quality criterion optimized by the particular distribution strategy is checked in a result menu step, wherein the check is carried out either directly or indirectly.

A sufficiently good evaluation of the optimization result of the spreading strategy "uniform crop spreading" is achieved via the direct or indirect detection thereof, wherein the direct detection takes place by sensing the spreading on the ground of the crop flow exiting the combine harvester, and the indirect detection takes place by processing characteristic curve fields stored in the arithmetic logic unit. In an analogous manner and for the same purpose, the driver assistance system directly or indirectly detects the result of the spreading strategy "chop quality", wherein the direct detection takes place by detecting the crop flow and the indirect detection takes place by processing a chop quality model stored in the arithmetic logic unit. In addition, the sufficiently good evaluation of the result of the spreading strategy "energy efficiency" is determined by direct or indirect detection, wherein the direct detection is carried out by measuring torque and/or speed and/or engine load, and the indirect detection takes place by processing an energy efficiency model stored in the arithmetic logic unit.

Due to the contrary interrelationship between chop quality and energy demand, it is provided in an embodiment that the spreading strategies "chop quality" and "energy efficiency", which are stored in the driver assistance system, are combined and balanced with one another. This has the effect, in particular, that the chopping length is selected, with consideration for the crop properties, to be only as short as necessary to achieve sufficiently good decay, which ultimately results in a minimization of the energy demand.

In one development of the invention, the optimization of the mutually influential quality criteria "chop quality" and "energy demand" is improved when the operator of the combine harvester is provided with an ability to define limit values for chop quality and energy demand as well as prioritize one of the spreading strategies "chop quality" and "energy efficiency" or change the weighting of these spreading strategies.

For that matter, the efficiency of the driver assistance system according to the invention also is increased in that the driver assistance system determines a change in the machine parameters on the basis of the instructions input by the driver and the stored characteristic curves and immediately implements the determined change in the machine parameters.

BRIEF DESCRIPTION OF THE DRAWINGS

Further features and advantages of the invention will become apparent from the description of embodiments that follows, with reference to the attached figures, wherein:

FIG. 1A presents a side view of an agricultural working machine designed as a combine harvester in which a driver assistance system according to the invention is included;

FIG. 1B presents an expanded view of the straw chopper and discharge hood, which are included within a portion of the machine that is surrounded by boundary line "BL" in FIG. 1A;

DETAILED DESCRIPTION OF THE PREFERRED EMBODIMENTS

Figure 2A:
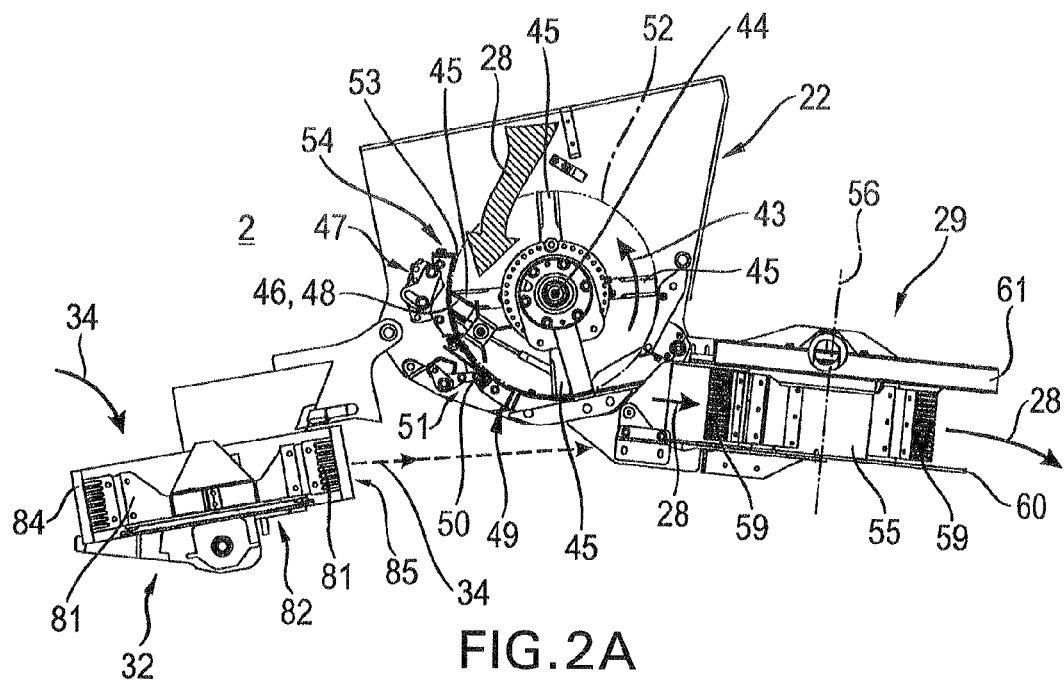
FIG. 2A presents a detailed side view of the a straw chopper and radial spreader combination with chaff blower.

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

An agricultural working machine 1 designed as a combine harvester 2 is depicted schematically in FIG. 1A. Agricultural working machine 1 comprises a grain'cutterbar 3 in the front region thereof, which is connected in a manner known per se to a slope conveyor 4 of the combine harvester 2. The crop flow 5 passing through the slope conveyor 4 is transferred in the upper, rear region of the slope conveyor 4 to threshing mechanisms 7 of the combine harvester 2, which are at least partially enclosed on the underside by the threshing concave 6. A deflector drum 8 arranged downstream of the threshing mechanisms 7 redirects the crop flow 5 in the rear region of the threshing mechanisms 7 after the crop flow exits the threshing mechanisms 7 such that the crop flow is transferred directly to a separating device 10 designed as a tray-type shaker 9. It lies within the scope of the invention that the separating device 10 also can be designed as a separator rotor, which is known per se and is therefore not depicted. The crop flow 5 is conveyed on the rotating tray-type shaker 9 such that any unencumbered grains 11 contained in the crop flow 5 are separated out in the region underneath the tray-type shaker 9. The grains 11 that are separated out at the threshing concave 6 and on the tray-type shaker 9 are directed via the return pan 12 and the feeder floor 13 to a cleaning device 17, which comprises a plurality of sieve levels 14, 15, and a fan 16. The cleaned grain flow 20 is then transferred via elevators 18 to a grain tank 19.

In the rear region of the separating device 10, which is designed as a tray-type shaker 9, a shredding device 23 is assigned to the separating device. The shredding device is enclosed by a funnel-shaped housing 21, is designed as a straw chopper 22, and is described in greater detail in the following. The straw 25 exiting the tray-type shaker 9 at the rear is fed to the straw chopper 22 on the top side thereof.

The straw 25 exiting the tray-type shaker 9 also can be deflected, by a pivotable straw deflector flap 24, such that the straw is deposited directly on the ground 26 in a swath. In the outlet region 27 of the straw chopper 22, the crop flow 28 consisting of the chopped/shredded straw 25 is transferred to a so-called radial spreader 29, which discharges the crop flow 28, in the outlet region 30 thereof, in a manner to be described in greater detail such that a wide distribution of the crop flow 28 on the ground 26 results.

In the embodiment shown, the cleaning device 17 has assigned to the rear region thereof a chaff conveying device 31, which is designed either as a chaff blower 32 or a chaff spreader 33 in a manner to be described in greater detail. The chaff 34 exiting the cleaning device 17 is fed to the chaff conveying device 31 on the top side thereof. If the intention is to transfer the straw 25 to the straw chopper 22 for chopping/shredding and to spread the straw on the ground 26 by the radial spreader 29, the chaff conveying device 31 is designed as a chaff blower 32. In this case, the chaff 34 conveyed by the chaff blower 32 is transferred, in the rear region 35 of the chaff blower, directly to the radial spreader 29, wherein the radial spreader spreads the chopped/shredded straw 25 and the chaff 34 on the ground 26 in one single crop flow 28. If the intention is to deposit the straw 25 on the ground 26 as a swath, the straw chopper 22 and radial spreader 29 are shut off. In this case, the chaff conveying device 31 is designed as a chaff spreader 33, which spreads the chaff 34 flat on the ground 26, in a manner analogous to that of the radial spreader 29. The chaff conveying device 31 also is designed as a chaff spreader 33 when, instead of the radial spreader 29, a discharge hood 42 is assigned to the straw chopper 22 for spreading the crop flow 28 on the ground 26 (FIG. 1B), wherein said discharge hood will be described in greater detail below (see FIGS. 3A and 3B).

The agricultural working machine 1 also comprises a driver's cab 36, in which at least one control/regulating unit 38 equipped with a display unit 37 is arranged, by means of which a plurality of processes to be described in greater detail may be controlled, said processes being initiated automatically or by the operator 39 of the agricultural working machine 1. The control/regulating unit 38 communicates with a plurality of sensor systems 41 via a so-called bus system 40 in a manner known per se. The structure of the sensor systems 41 is described in detail in DE 101 47 733, the entire contents of which are hereby incorporated in the disclosure of this patent application, and so the structure of the sensor systems 41 will not be described again in the following.

Figure 2B:
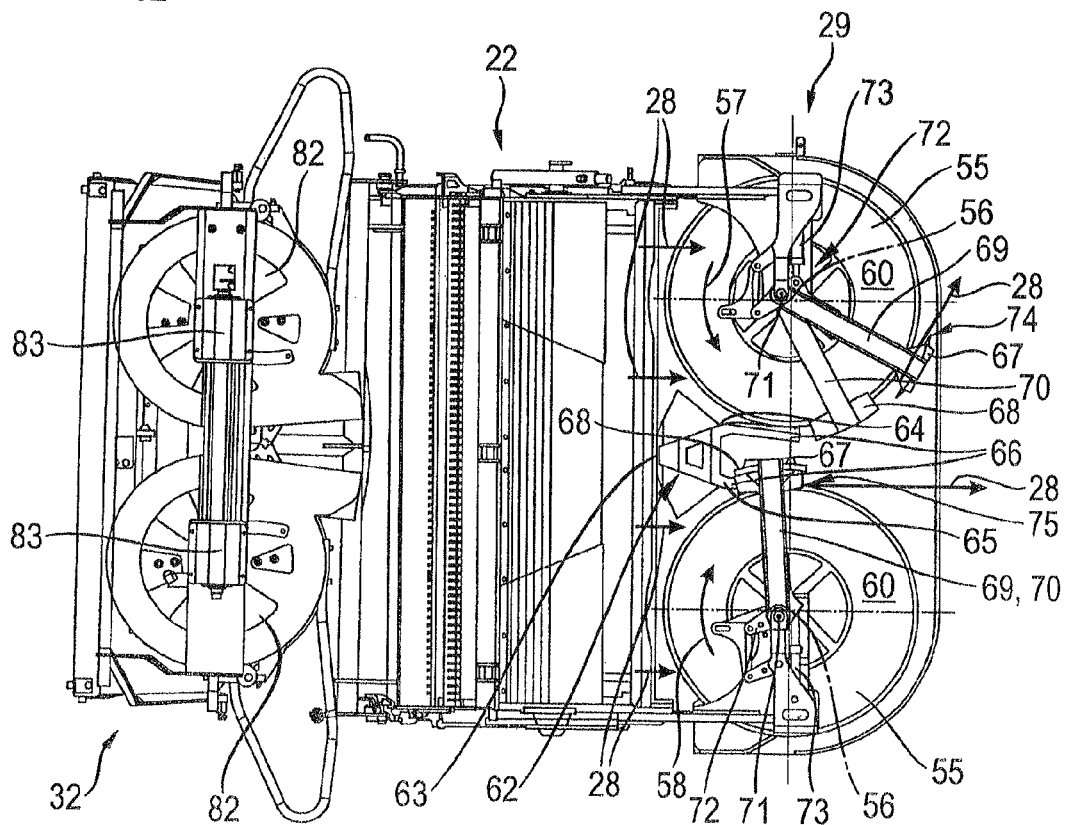
FIG. 2B presents a bottom plan view of the chaff spreader, straw chopper, and radial spreader combination of FIG. 2A.

FIG. 2A presents structural details of the straw chopper 22, radial spreader 29 combination with chaff blower 32 in a side view where FIG. 2B presents a view of the straw chopper 22, radial spreader 29 combination with chaff blower 32 from underneath.

In the embodiment shown, the chopper shaft 44, which revolves in the arrow direction 43 (FIG. 2A), accommodates four rows of freely movable chopper knives 45, said rows being distributed around the periphery of the chopper shaft. In the rear region of the straw chopper 22, the chopper knives 45 mesh with at least one knife support 46, which is mounted in the frame of the combine harvester 2, wherein the knife support 46 is pivoted via adjusting means 47 such that the counter blades 48 of the knife support 46 can be swivelled further into or out of the effective region of the chopper knives 45. The chopping length that sets in is influenced by changing the position of the knife support(s) 46 such that the chopping/shredding of the crop flow 28 increases as the engagement of the counter blades 48 increases.

The chopper wall 49 enclosing the revolving chopper blades 48 also accommodates a grinding strap 50, which can be moved further toward or away from the peripheral circle 52 of the chopper blades 48 by adjusting means 51. The function of the grinding strap 50 is to brake the speed of the crop stream 28 passing through the straw chopper 22 such that the dwell time of the crop stream 28 in the straw chopper 22 and, therefore, the extent of the chopping/shredding thereof, increases. The chopper wall 49 also accommodates a shear bar 53, which also can be moved further toward or away from the peripheral circle 52 of the chopper blades 48 by suitable adjusting means 54, wherein the shear bar 53 has the effect of increasing the fanning out of the particles of the crop flow 28 as the distance to the peripheral circle 52 of the chopper blades 48 decreases.

The radial spreader 29 arranged downstream of the straw chopper 22 consists of two blowers 55, which are arranged next to one another and revolve opposite one another about vertical axes of rotation 56 according to the arrow directions 57, 58 and carry the crop flow 28 chopped/shredded by the straw chopper 22 out of the combine harvester 2 and spread the crop flow on the ground 26 in a manner to be described in greater detail. The axes of rotation 56 are equipped with flexible paddles 59, which are covered at the bottom by a concurrently rotating disk 60 and are closed at the top by cover plates 61. Assigned to the two blowers 55, which are formed by the upper cover plates 61, the axes of rotation 56, the paddles 59, and the concurrently rotating disks 60, is a crop separating plate 62, the tip 63 of which is directed against the crop flow 28 discharged from the straw chopper 22 such that the crop flow is distributed onto the blowers 55.

The diverging legs 64, 65 of the crop separating plate 62 also form, via the trailing ends thereof, the fixed partial casings 66 for the blowers 55.

In addition, each blower 55 has first and second movable wall parts, so-called spreading plates 67, 68, which are driven via bellcranks 69, 70 about axle rotations 71 in a revolving manner such that the outward spreading plate 67 precedes the inner spreading plate 68. The movable spreading plates 67, 68 are each driven via lifting cylinders 73, which are operatively connected to a coupling mechanism 72, such that the leading spreading plate 67 revolves at a faster speed than the trailing, inner spreading plate 68. The front end of the leading spreading plate 67 is the so-called discharge edge 74, 75, via which the crop flow 28 exits the particular radial blower 55. The rotational movement of the discharge edges 74, 75 is controlled via the movement of the bellcranks 69, 70 such that the pivot speed thereof decreases as the spacing of the discharge edges 74, 75 from the respectively adjacent blower 55 increases. The effect thereof is that the discharge edges 74, 75 have short dwell times in the overlapping region thereof and longer dwell times in the outer regions, thereby ensuring that the crop flow 28 exiting at the discharge edges 74, 75 is spread more homogeneously on the ground 26.

In addition, the pivot range of the discharge edges 74, 75 and, therefore, the spreading width of the radial spreader 29, can be adjusted. The chaff blower 32 is assigned to the straw chopper 22 in the underside region of said straw chopper facing away from the radial spreader 29. The chaff blower 32 accommodates a blower 82 in the interior thereof, which is provided with conveying elements 81 and is driven so as to revolve about a vertical axis 83. The paneling 84 of the chaff blower 32 is designed such that the paneling has an opening 85 pointing in the direction of the radial spreader 29, via which the chaff 34 discharged from the cleaning device 17 is conveyed into the crop flow 28 entering the radial spreader 29. It lies within the scope of the invention that the chaff blower 32 has revolving blowers 82, which are arranged at least in pairs.

Figure 3A:
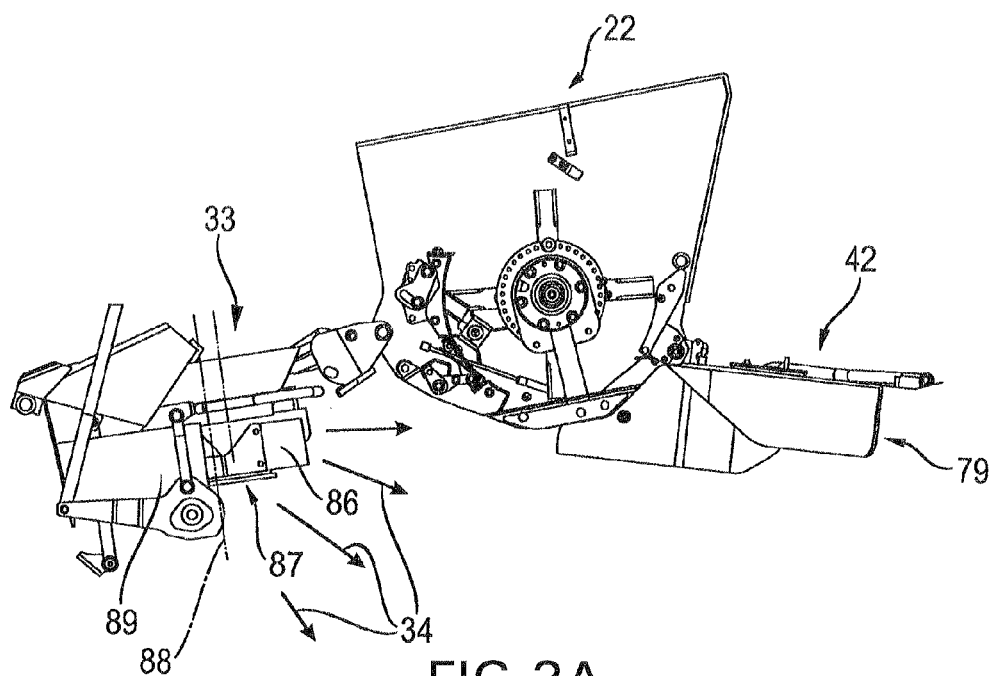
FIG. 3A shows a detailed side view of a chaff spreader, straw chopper and discharge hood.
Figure 3B:
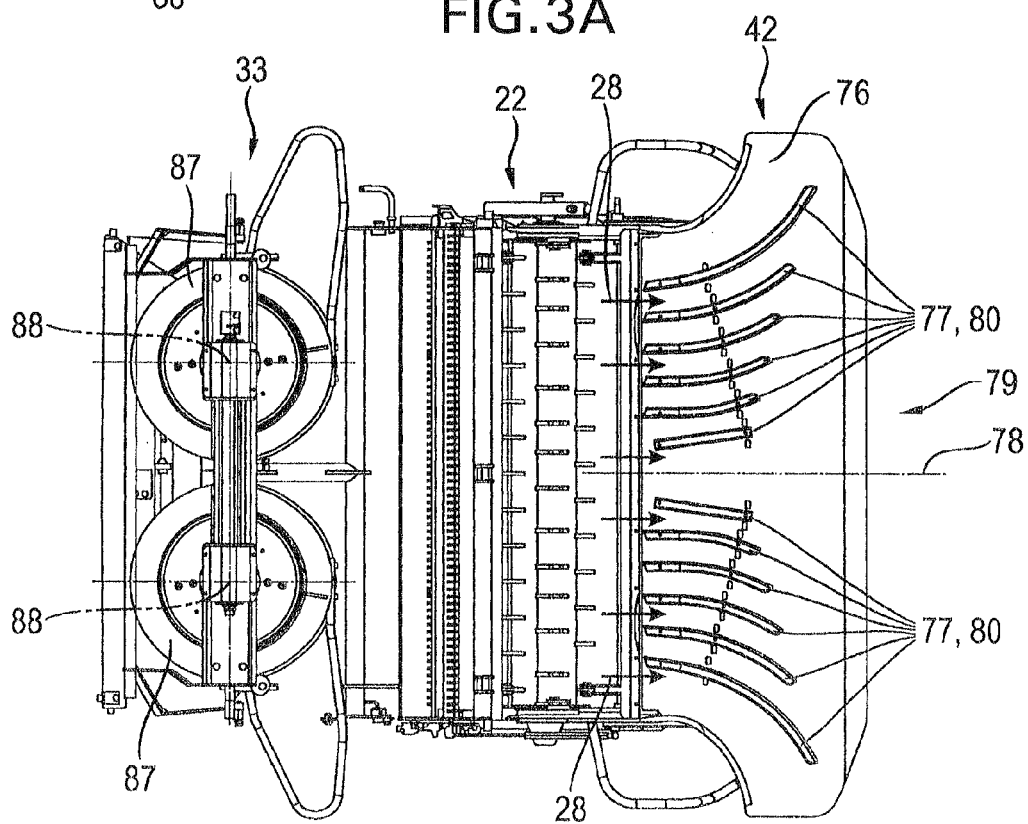
FIG. 3B shows a bottom plan view of a chaff spreader, straw chopper and discharge hood of FIG. 3A.

FIG. 3A depicts structural details of the straw chopper 22 and straw discharge hood 42 combination with chaff spreader 33 in a side view and FIG. 3A depicts the details of straw chopper 22 and straw discharge hood 42 combination with chaff spreader 33 in a view from underneath. Since the straw chopper 22 corresponds to that according to FIGS. 2A and 2B, only the details of the straw discharge hood 42 and the chaff spreader 33 will be described here. The straw discharge hood 42 is substantially formed by a paneling hood 76 (FIG. 3B), which forms a boundary at the top and on the sides and to which a plurality of crop guide tracks 77 is assigned in the interior thereof. The crop guide tracks 77 have right- and left-side orientations relative to a central region 78, and therefore the crop flow 28 entering the straw discharge hood 42 exits the outlet region 79 of the straw discharge hood 42 so as to be oriented toward the right or the left. The crop guide tracks 77 can be formed by web plates 80 that are either flat or have a changeable curvature. In addition, the orientation of the crop guide tracks 77 in the paneling hood 76 can be adjusted such that the transverse conveying effect thereof is either increased or reduced. A chaff spreader 33 is assigned to the straw chopper 22 in the underside region of said straw chopper facing away from the straw discharge hood 42. The chaff spreader 33 accommodates a blower 87 in the interior thereof, which is provided with conveying elements 86 and is driven so as to revolve about a vertical axis 88. The paneling 89 of the chaff spreader 33 is designed such that the chaff 34 discharged from the cleaning device 17 is spread directly on the ground 26. It lies within the scope of the invention that the chaff spreader 33 has revolving blowers 87, which are arranged at least in pairs.

Figure 4:
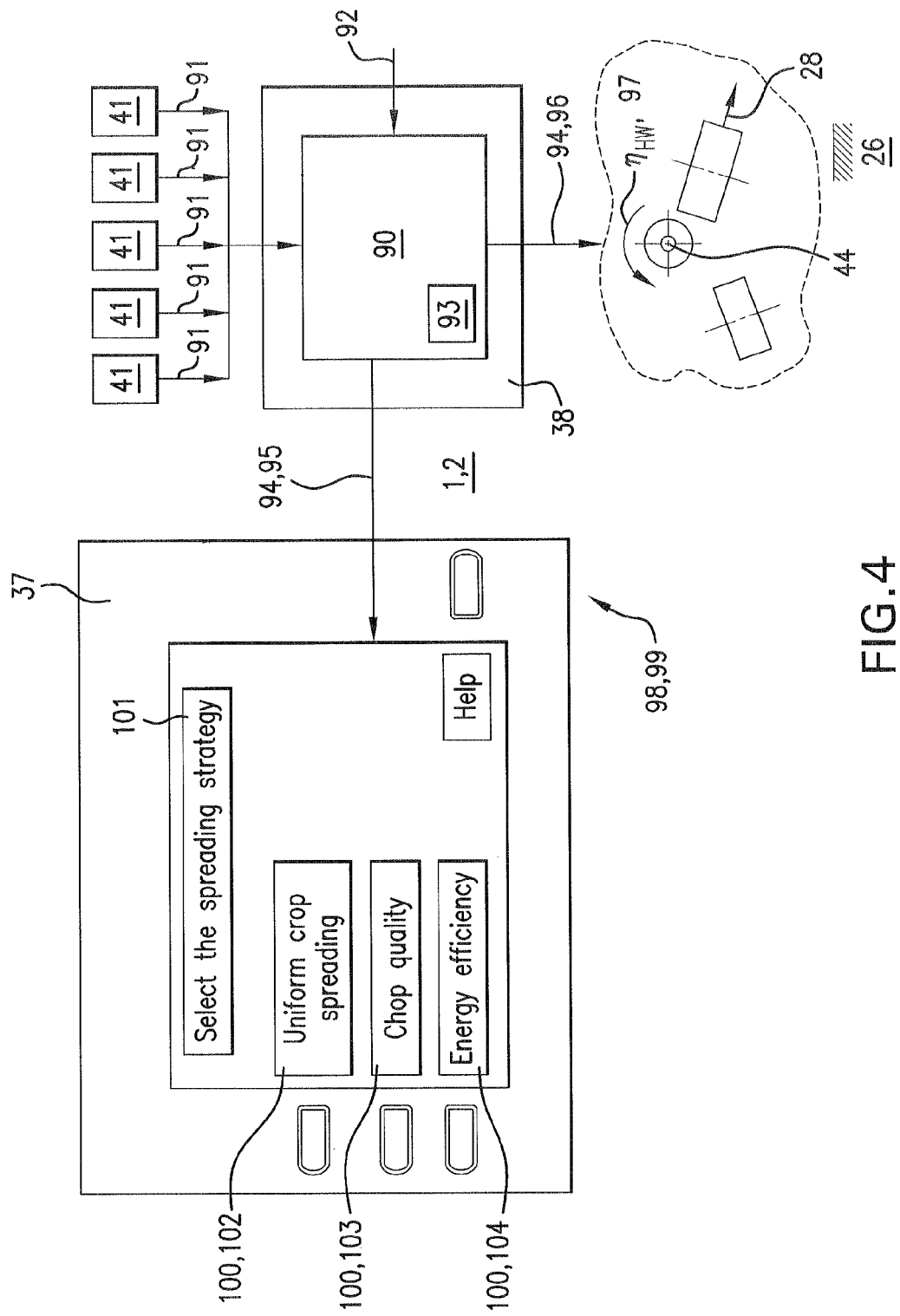
FIG. 4 presents a schematic view of the driver assistance system according to the invention.

FIG. 4 shows a schematic illustration of the display unit 37, the control/regulating device 38, and the arithmetic logic unit 90, which is assigned to the control/regulating device 38 and is coupled to the display unit 37. The arithmetic logic unit 90 is designed such that this can process the information 91 generated by the sensor systems 41, as well as external information 92 and information 93 stored in the arithmetic logic unit 90 itself, such as expert knowledge, in order to obtain a plurality of output signals 94. The output signals 94 are designed such that these at least comprise display control signals 95 and working mechanism control signals 96. The former determine the contents of the display unit 37 and the latter bring about, in a manner according to the invention, the change of the highly diverse working mechanism parameters 97 of the agricultural working machine 1, such as, for example, the speed $n_{HW}$ of the chopper shaft 44, with the objective of achieving a homogeneous distribution on the ground 26 of the crop flow 28 exiting the combine harvester 2. The control/regulating device 38, with the display 37 unit assigned thereto and the arithmetic logic unit 90, are a component of the driver assistance system 98 according to the invention. The driver assistance system 98 is designed as a so-called automated chopper and spreading device 99, which optimizes the spreading of the crop flow 28 on the ground 26.

According to the invention, the driver assistance system 98 is designed such that this includes spreading strategies 100, which can be selected and edited in order to regulate the spreading of the crop flow 28 exiting the combine harvester 2 and which can be selected by the operator 39 of the agricultural working machine 1 in a first menu step 101.

A particularly efficient optimization of the spreading is achieved when the selectable spreading strategies 100 include at least one or more of the spreading strategies "uniform crop spreading" 102, "chop quality" 103, and "energy efficiency" 104. The spreading strategy "uniform crop spreading" 102 brings about an optimization of the spreading of the crop flow 28 on the ground 26. The spreading strategy "chop quality" 103 results in an optimization of the chopping/shredding of the crop flow 28 in the shredding device 23, while the spreading strategy "energy efficiency" 104 brings about an optimization of the energy demand for the chopping/shredding and spreading of the crop flow 28.

Figure 5:
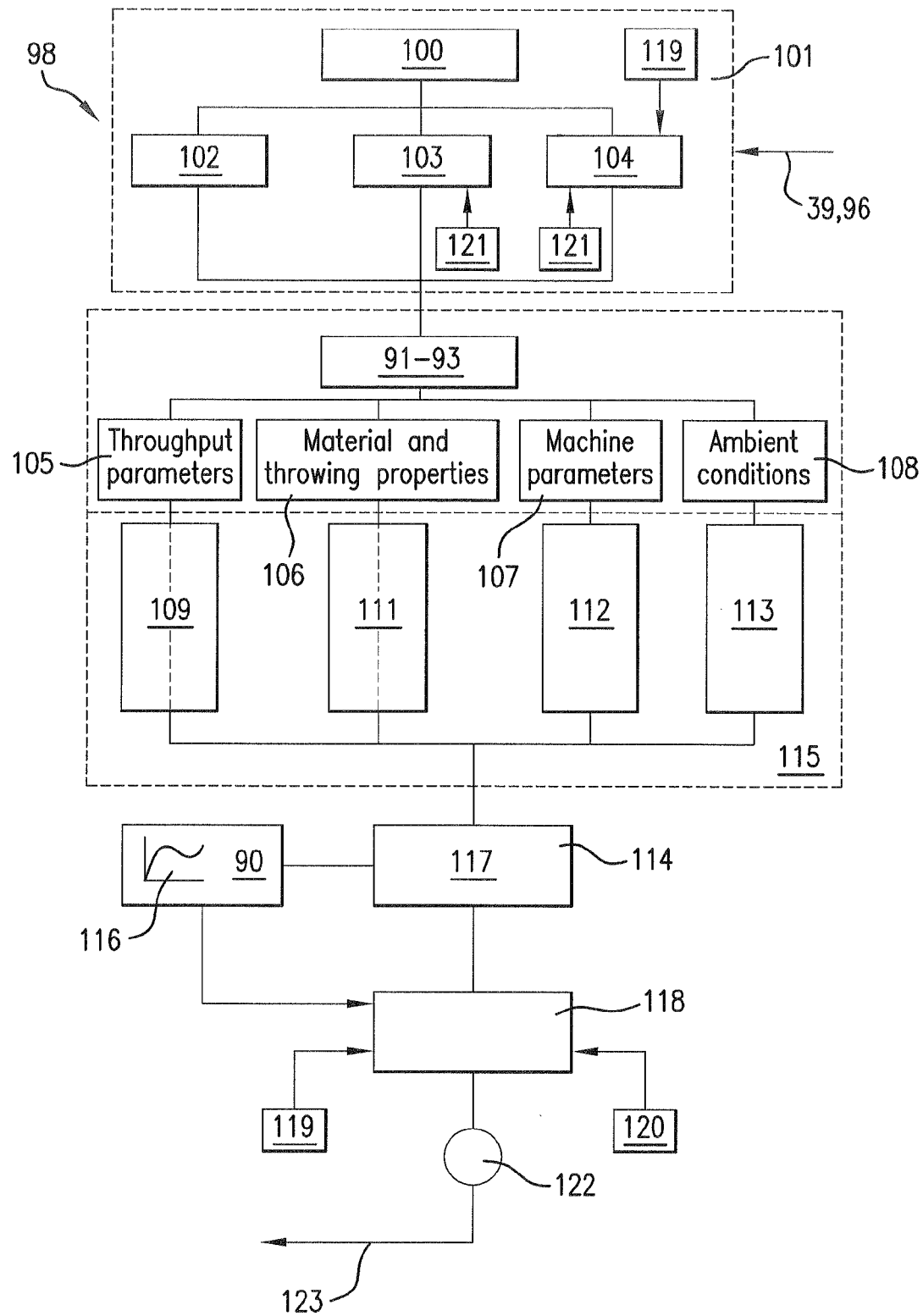
FIG. 5 shows another schematic view of the driver assistance system according to the invention, according to FIG. 4.

The details of the spreading strategies 100 according to the invention are described schematically in FIG. 5. In a first menu step 101, a spreading strategy 102-104 or a combination of a plurality of spreading strategies 102-104 is selected by the driver 39 of the combine harvester 2 or is proposed by the driver assistance system 98. Each of the spreading strategies 102-104 takes into account a large amount of information 91-93 accessible to the driver assistance system 98, wherein this information at least includes the information "throughput parameters" 105, "material or throwing properties" 106, "machine parameters" 107, and "ambient conditions" 108.

The throughput-dependent influence on the spreading of the crop flow 28 on the ground 26 is detected sufficiently well when the information "throughput parameters" 105 include one or more of the throughput-relevant parameters 109 grain throughput, material feed height in a slope conveyor 4 assigned to the combine harvester 2, drive engine load, required drive power of the shredding device 23, required drive power of the spreading devices 110, and/or transverse and longitudinal distribution of the crop flow 28 in the shredding device 23. Depending on the equipment of the combine harvester 2, the spreading device 110 can comprise a radial spreader 29, chaff conveying devices 31, and/or a discharge hood 42.

The throwing property-dependent influence on the spreading of the crop on the ground 26 is detected well when the information "material and throwing properties" 106 includes one or more of the throwing property-relevant parameters 111 straw moisture, chopping length, fanning out, crop density, toughness, and type of crop.

The machine parameter-dependent influence on the spreading that is related to the shredding device 23 is detected sufficiently well when the shredding device 23 is designed as a straw chopper 22 and the crop flow 28 is chopped/shredded in the straw chopper 22 via the interaction of revolving chopper knives 45 with stationary counter blades 48, one or more shear bars 53 and one or more grinding straps 50, and the information "machine parameters" 107 includes one or more of the machine-relevant parameters 112 number and position of the grinding straps 50, the counter blades 48, the shear bars 53, and wear parameters of the chopper knives 45 and speed parameters of the chopper shaft 44.

If the spreading device 110 is designed as a radial spreader 29 having, at the least, deflectable spreading plates 67, 68 and one or more blowers 55, the machine parameter-dependent influence on the spreading of the crop flow 28 on the ground 26 is detected sufficiently well when the information "machine parameters" 107 includes one or more of the machine-relevant parameters 112 deflection, oscillatory frequency and spreading curve of the spreading plates 67, 68, speed parameters of the blowers 55 and upstream revolving working mechanisms of the combine harvester 2.

If the spreading device 110 is designed as a chaff blower 32 or a chaff spreader 33, however, the machine-relevant parameter 112 is limited at least to the speed of the blower 82, 87 assigned to the chaff blower 32 or the chaff spreader 33. If the spreading device 110, which spreads the crop flow 28 on the ground 26, is designed as a discharge hood 42 provided with crop guide tracks 77, the machine-relevant parameter 112 includes, at least, the orientation of the crop guide tracks 77 in the discharge hood 42. The ambient condition-dependent influence on the spreading of the crop flow 28 on the ground 26 is detected sufficiently well when the information "ambient conditions" 108 includes one or more of the ambient condition-relevant parameters 113 air humidity and air temperature parameters, wind parameters such as wind speed and wind direction, and tilt parameters.

In a next menu step 114, the driver assistance system 98 processes the particular spreading strategy 100 in a manner according to the invention with consideration for the available information 115 and the characteristic curves 116 stored in the arithmetic logic unit 90 such that the quality criteria crop spreading 117a, chop quality 117b, and energy demand 117c are optimized. In a result menu step 118, the quality criterion 117a-c optimized by the respective spreading strategy 102-104 is checked, wherein the check is carried out directly or indirectly.

When the spreading strategy "uniform crop spreading" 102 is processed, the spreading on the ground 26 of the crop flow 28 exiting the combine harvester 2 is checked directly by directly sensing the spreading, e.g., by camera or laser systems known per se. The indirect detection takes place, for example, by processing the characteristic curve fields 116 stored in the arithmetic logic unit 90.

In an analogous manner, when the spreading strategy "chop quality" 103 is processed, the direct detection of the result takes place by crop flow detection by means of crop analysis sensors, which are known per se, such as NIR sensors. The indirect detection takes place by processing a chop quality model 119 stored in the arithmetic logic unit 90, wherein the chop quality model 119 adjusts the chopping length, for example, depending on crop properties that are detected.

When the spreading strategy "energy efficiency" 104 is processed, the direct detection of the result is carried out by measuring the torque and/or speed and or engine load. The indirect detection takes place by processing an energy efficiency model 120 stored in the arithmetic logic unit 90, wherein the energy efficiency model 120 varies the drive energy demand depending on crop properties, in a manner analogous to the chop quality model 119.

The optimization of the quality parameters chop quality 117b and energy demand 117c can also be further improved by combining or balancing the spreading strategies "chop quality" 103 and "energy efficiency" 104, which are stored in the driver assistance system 98, with one another. The background is that the quality parameters chop quality 117b and energy demand 117c have opposing tendencies, since the energy demand is that much greater the more finely the crop flow 28 is chopped/shredded in order to promote rapid decay. An advantageous development of the invention results in this context when the operator 39 of the combine harvester 2 can define limit values 121 for the chop quality 117b and the energy demand 117c and can prioritize one of the spreading strategies "chop quality" 103 and "energy efficiency" 104 or can change the weighting of these spreading strategies 100.

In another menu step 122, the driver assistance system 98 induces a change in machine parameters 107 with consideration for the requirements of the operator 39 and the stored characteristic curves 116, 119, 120. Finally, the optimizing process can be cyclically repeated in the manner of a closed loop 123, wherein the cyclic repetition takes place either automatically or is initiated by the operator 39.

LIST OF REFERENCE NUMBERS 1 agricultural working machine
2 combine harvester
3 grain cutterbar
4 slope conveyor
5 crop stream
6 threshing concave
7 threshing mechanism
8 deflector drum
9 tray-type shaker
10 separating device
11 grain
12 return pan
13 feeder floor
14 sieve level
15 sieve level
16 fan
17 cleaning device
18 elevator
19 grain tank
20 grain flow
21 housing
22 straw chopper
23 shredding device
24 straw deflector flap 25 straw
26 ground
27 outlet region
28 crop flow
29 radial spreader
30 outlet region
31 chaff conveying device
32 chaff blower
33 chaff spreader
34 chaff
35 rear region
36 driver's cab
37 display unit
38 control/regulating unit
39 operator
40 bus system
41 sensor system
42 discharge hood
43 arrow direction
44 chopper shaft
45 chopper knife
46 knife support
47 adjusting means
48 counter blades
49 chopper wall
50 grinding strap
51 adjusting means
52 peripheral circle
53 shear bar
54 adjusting means
55 blower
56 axis of rotation
57, 58 arrow direction
59 paddle
60 disk
61 cover plate
62 crop separating plate
63 tip
64, 65 leg
66 partial casing
67, 68 spreading plate
69, 70 bellcrank
71 axle rotation
72 coupling mechanism
73 lifting cylinder
74, 75 discharge edge
76 paneling hood
77 crop guide tracks
78 central region
79 outlet region
80 web plate
81 conveying element
82 blower
83 vertical axis
84 paneling
85 opening
86 conveying element
87 blower
88 vertical axis
89 paneling
90 arithmetic logic unit
91 internal information
92 external information
93 information
94 output signals
95 display control signals
96 working mechanism control signals
97 working mechanism parameter
98 driver assistance system
99 automated chopper and spreading device
100 spreading strategy
101 first menu step
102 uniform crop spreading
103 chop quality
104 energy efficiency
105 throughput parameter
106 material or throwing properties
107 machine parameter
108 ambient conditions
109 throughput-relevant parameter
110 spreading devices
111 throwing property-relevant parameter
112 machine-relevant parameter
113 ambient condition-relevant parameter
114 further menu step
115 available information
116 characteristic curve
117 quality criterion
118 result menu step
119 chop quality model
120 energy efficiency model
121 limit value
122 menu step
123 closed loop
$n_{HW}$ speed of the chopper shaft As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A combine harvester including a driver assistance system that regulates a spreading on the ground of a crop flow exiting the combine harvester, the driver assistance system comprising:
   an arithmetic logic unit;
   at least one display unit;
   a shredding device, for chopping or shredding the crop flow passing through the shredding device; and
   a spreading device disposed in a rear region of the combine harvester for spreading the chopped or shredded crop flow on the ground;
   wherein the at least one display unit displays spreading strategies for selection by an operator of the combine harvester;
   wherein the arithmetic logic unit processes information generated by sensor systems disposed within the combine harvester, and processes external information and information stored in the arithmetic logic unit;
   wherein the selectable spreading strategies include spreading strategies selected from the group consisting of uniform crop spreading, chop quality and energy efficiency;
   and
   wherein the driver assistance system implements a particular one of the spreading strategies that is selected by the operator with consideration for the available information, to regulate at least the shredding device and spreading device for uniform spreading of the crop flow exiting the combine harvester, to optimize the uniform crop spreading on the ground, to optimize a chopping or shredding quality of the crop flow exiting the combine harvester or to optimize an energy demand relating to an energy efficiency for the chopping, shredding and spreading of the crop flow.

2. The combine harvester of claim 1, wherein a spreading strategy or a combination of the spreading strategies is selected by the on operator of the combine harvester or is proposed by the driver assistance system.

3. The combine harvester of claim 1, wherein each of the spreading strategies takes into account information accessible in the driver assistance system that includes information throughout parameters, material or throwing properties, machine parameters and ambient conditions.

4. The combine harvester of claim 3, wherein the information throughput parameters include one or more of throughput-relevant parameters: grain throughput, material feed height in a slope conveyor assigned to the combine harvester, drive engine load, required drive power of the shredding device, required drive power of the spreading devices, transverse and longitudinal distribution of the crop flow in the shredding device.

5. The combine harvester of claim 3, wherein the information material and throwing properties includes one or more of the throwing property-relevant parameters straw moisture, chopping length, fanning out, crop density, toughness, and type of crop.

6. The combine harvester of claim 3, wherein the shredding device is designed as a straw chopper and the crop flow is chopped or shredded in the straw chopper via the interaction of revolving chopper knives with stationary counter blades, at least one shear bar and one or more grinding straps and wherein the information machine parameters includes one or more of the machine-relevant parameters number and position of the grinding straps, the counter blades, the shear bars, and wear parameters of the chopper knives and speed parameters of the chopper shaft.

7. The combine harvester of claim 3, wherein the spreading device that spreads the crop flow on the ground is designed as a radial spreader and has, at the least, deflectable spreading plates and one or more blowers and wherein the information machine parameters includes one or more of the machine-relevant parameters deflection, oscillatory frequency and spreading curve of the spreading plates, and speed parameters of the blowers and upstream revolving working mechanisms of the combine harvester.

8. The combine harvester of claim 3, wherein the spreading device is designed as a chaff blower or a chaff spreader and the machine-relevant parameters include, at the least, the speed of the blower assigned to the chaff blower or the chaff spreader.

9. The combine harvester of claim 3, wherein the spreading device is designed as a discharge hood equipped with crop guide tracks and the machine-relevant parameter includes, at the least, an orientation of the crop guide tracks.

10. The combine harvester of claim 3, wherein the information ambient conditions includes air humidity and air temperature parameters, wind parameters, and tilt parameters.

11. The combine harvester of claim 1, wherein the driver assistance system processes a particular spreading strategy with consideration for the available information and characteristic curves stored in the arithmetic logic unit and brings about an optimization of the quality criteria crop spreading, chop quality and energy demand.

12. The combine harvester of claim 11, wherein in a result menu step, the quality criterion optimized by the respective spreading strategy is checked, and wherein the check is carried out either directly or indirectly.

13. The combine harvester of claim 12, wherein the driver assistance system directly or indirectly detects the result of the spreading strategy uniform crop spreading, and wherein direct detection takes place by sensing the spreading on the ground of the crop flow exiting the combine harvester and indirect detection takes place by processing characteristic curve fields stored in the arithmetic logic unit.

14. The combine harvester of claim 12, wherein the driver assistance system directly or indirectly detects the result of the spreading strategy chop quality, wherein the direct detection takes place by detecting the crop flow, and wherein the indirect detection takes place by processing a chop quality model stored in the arithmetic logic unit.

15. The combine harvester of claim 12, wherein the driver assistance system directly or indirectly detects the result of the spreading strategy energy efficiency, wherein the direct detection takes place by measuring one or more of the torque, speed, engine load and wherein the indirect detection takes place by processing an energy efficiency model stored in the arithmetic logic unit.

16. The combine harvester of claim 1, wherein the spreading strategies chop quality and energy efficiency, which are stored in the driver assistance system, are combined and balanced with one another.

17. The combine harvester of claim 16, wherein the operator of the combine harvester defines limit values for the chop quality and energy demand and prioritizes one of the spreading strategies chop quality and energy efficiency or can change the weighting of these spreading strategies.

18. The combine harvester of claim 16, wherein the driver assistance system induces a change in the machine parameters with consideration for the requirements of the operator and the stored characteristic curves.

* * * * *